US008350841B2

(12) United States Patent
Li et al.

(10) Patent No.: US 8,350,841 B2
(45) Date of Patent: Jan. 8, 2013

(54) ESD PROTECTION CIRCUIT AND DISPLAY APPARATUS USING THE SAME

(75) Inventors: Chia-Sheng Li, Hsin-Chu (TW); Yung-Chih Chen, Hsin-Chu (TW); Chih-Lung Lin, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 166 days.

(21) Appl. No.: 13/016,302

(22) Filed: Jan. 28, 2011

(65) Prior Publication Data

US 2011/0285690 A1 Nov. 24, 2011

(30) Foreign Application Priority Data

May 24, 2010 (TW) ............................... 99116569 A

(51) Int. Cl.
*G06F 3/038* (2006.01)
*G09G 5/00* (2006.01)
*H02H 3/20* (2006.01)
*H02H 9/04* (2006.01)
*H02H 9/00* (2006.01)
*H02H 3/22* (2006.01)

(52) U.S. Cl. ......... 345/212; 345/211; 361/91.1; 361/56; 361/111

(58) Field of Classification Search .................. 345/212; 361/56, 91, 111
See application file for complete search history.

(56) References Cited

U.S. PATENT DOCUMENTS

| | | | | |
|---|---|---|---|---|
| 5,946,177 | A * | 8/1999 | Miller et al. | 361/56 |
| 6,043,971 | A * | 3/2000 | Song et al. | 361/111 |
| 6,919,602 | B2 * | 7/2005 | Lin et al. | 257/360 |
| 7,110,229 | B2 | 9/2006 | Yang et al. | |
| 7,158,357 | B2 | 1/2007 | Hu | |
| 7,203,045 | B2 * | 4/2007 | Chatty et al. | 361/91.1 |
| 7,420,251 | B2 * | 9/2008 | Chen et al. | 257/355 |
| 7,595,968 | B2 * | 9/2009 | Hung et al. | 361/56 |
| 2003/0227304 | A1 | 12/2003 | Saito et al. | |

FOREIGN PATENT DOCUMENTS

CN 1467844 1/2004

* cited by examiner

*Primary Examiner* — Alexander Eisen
*Assistant Examiner* — Nan-Ying Yang
(74) *Attorney, Agent, or Firm* — WPAT PC; Justin King

(57) ABSTRACT

An ESD protection circuit comprises three transistors and two voltage dividers. The two source/drain terminals of a first transistor are electrically coupled to a first power line and a second power line respectively. The two source/drain terminals of a second transistor are electrically coupled to the first power line and a gate terminal of the first transistor respectively. The two source/drain terminals of a third transistor are electrically coupled to the gate terminal of the first transistor and the second power line respectively. A first voltage divider supplies a first voltage to a gate terminal of the second transistor according to a potential difference between the first power line and the second power line. A second voltage divider supplies a second voltage to a gate terminal of the third transistor according to the potential difference between the first power line and the second power line.

13 Claims, 7 Drawing Sheets

ESD PROTECTION CIRCUIT AND DISPLAY APPARATUS USING THE SAME

BACKGROUND

1. Technical Field

The present invention relates to the electrostatic discharge (ESD) technology field and, more particularly, to an ESD protection circuit and a display apparatus using the same.

2. Description of the Related Art

Conventional liquid crystal display apparatus mainly employs thin-film transistor (TFT) diode, metal-insulator-metal (MIM) diode, lightning-rod design or impedance in series to prevent the main circuits of the liquid crystal display apparatus from being destroyed by the electrostatic discharge. For example, the conventional liquid crystal display apparatus can employ one of the aforementioned four manners to prevent a gate driver of the liquid crystal display apparatus from being destroyed by the electrostatic discharge or to prevent a pixel circuit of the liquid crystal display panel from being destroyed by the electrostatic discharge. The following will describe the above four manners in detail.

FIG. 1 is a schematic view of a conventional liquid crystal display apparatus. Referring to FIG. 1, the liquid crystal display apparatus 100 comprises a display panel 110, a plurality of ESD protection devices 120 and a shorting ring 130. The display panel 110 comprises a plurality of pixels 112, a plurality of gate lines 114 and a plurality of source lines 116, and each of the pixels 112 is electrically coupled to one of the gate lines 114 and one of the source lines 116. Furthermore, each of the ESD protection devices 120 is electrically coupled to the shorting ring 130, and each of the ESD protection devices 120 is electrically coupled to one of the gate lines 114 and the source lines 116.

In addition, each of the ESD protection devices 120 is composed of a plurality of transistors 122, and each of the transistors 122 is implemented by a thin-film transistor (TFT) electrically coupled by a specific manner. The so-called TFT diode is formed by a TFT which is electrically coupled by the specific manner. The ESD protection device 120 shown in FIG. 1 has the disadvantage that the threshold voltages Vth of the TFTs 122 of the ESD protection device 120 will shift after the ESD protection device 120 operates for a long time. This will affect the conducting capability of the TFTs 122.

FIG. 2 is a schematic view of another conventional liquid crystal display apparatus. In FIGS. 2 and 1, the objects of uniform labels represent the same element. Referring to FIG. 2, compared with the ESD protection device 120 shown in FIG. 1, each of the ESD protection devices 220 of the liquid crystal display apparatus 200 is implemented by the MIM diode. The ESD protection device 220 shown in FIG. 2 has the disadvantage that the conducting capability of the ESD protection device 220 is bad when the ESD is small, and the ESD protection device 220 is easily to breakdown to lead to a permanent damage when the ESD is large.

FIG. 3 is also a schematic view of another conventional liquid crystal display apparatus. In FIGS. 3 and 1, the objects of uniform labels represent the same element. Referring to FIG. 3, compared with the ESD protection device 120 shown in FIG. 1, each of the ESD protection devices 320 of the liquid crystal display apparatus 300 is implemented by designing a part of the metal region of a gate line 114 or a source line 116 with a part of the metal region of the shorting ring 130 to form a lightning-rod pattern. The ESD protection device 320 shown in FIG. 3 has the disadvantage that the ESD protection device 320 is also easily to be damaged when the ESD is large.

FIG. 4 is a schematic view of still another conventional liquid crystal display apparatus. In FIGS. 4 and 1, the objects of uniform labels represent the same element. Referring to FIG. 4, compared with the ESD protection device 120 shown in FIG. 1, each of the ESD protection devices 420 of the liquid crystal display apparatus 400 is implemented by a resistor. And the liquid crystal display apparatus 400 does not adopt the shorting ring 130 shown in FIG. 1. In addition, each of the gate lines 114 is electrically coupled to the gate driver (not shown) through a corresponding ESD protection device 420, and each of the source lines 116 is electrically coupled to the source driver (not shown) through a corresponding ESD protection device 420. The ESD protection device 420 shown in FIG. 4 has the disadvantage that the loading of the gate driver and the source driver will be increased to lead to poor driving capability after increasing the resistance of the resistor.

In summary, it can be seen that each of the aforementioned ESD protection manners has its disadvantage, and each of the disadvantages may cause the said main circuits to be damaged by the ESD because of the lack of effective prevention. Specifically, the said main circuits may be completely unable to be prevented from the ESD damage because of the perpetual damage of the ESD protection device. Since the ESD may occur anywhere, it is necessary to provide an ESD protection device with a stable and reliable performance. In addition, the provided ESD protection device must not to increase the loading of the gate driver and the source driver.

BRIEF SUMMARY

The present invention relates to an ESD protection circuit with a stable and reliable performance, which can be used in place of the conventional ESD protection device. In addition, the ESD protection circuit of the present invention does not to increase the loading of the gate driver and the source driver.

The present invention also relates to a display apparatus comprising the above ESD protection circuit.

The present invention provides an ESD protection circuit. The ESD protection circuit comprises a first transistor, a second transistor, a third transistor, a first voltage divider and a second voltage divider. The first transistor has a first gate terminal, a first source/drain terminal and a second source/drain terminal. The first source/drain terminal is electrically coupled to a first power line, and the second source/drain terminal is electrically coupled to a second power line. The second transistor has a second gate terminal, a third source/drain terminal and a fourth source/drain terminal. The third source/drain terminal is electrically coupled to the first power line, and the fourth source/drain terminal is electrically coupled to the first gate terminal. The third transistor has a third gate terminal, a fifth source/drain terminal and a sixth source/drain terminal. The fifth source/drain terminal is electrically coupled to the fourth source/drain terminal and the first gate terminal, and the sixth source/drain terminal is electrically coupled to the second power line. The first voltage divider is electrically coupled between the first power line and the second power line for supplying a first voltage to the second gate terminal according to a potential difference between the first power line and the second power line. The second voltage divider is electrically coupled between the first power line and the second power line for supplying a second voltage to the third gate terminal according to the potential difference between the first power line and the second power line.

The present invention also provides a display apparatus. The display apparatus comprises a display panel and an ESD protection circuit. The display panel has a pixel, a gate line and a source line. The pixel is electrically coupled to the gate line and the source line. The ESD protection circuit comprises a first transistor, a second transistor, a third transistor, a first voltage divider and a second voltage divider. The first transistor has a first gate terminal, a first source/drain terminal and a second source/drain terminal. The first source/drain terminal is electrically coupled to the gate line or the source line, and the second source/drain terminal is electrically coupled to a reference electrode. The second transistor has a second gate terminal, a third source/drain terminal and a fourth source/drain terminal. The third source/drain terminal is electrically coupled to the first source/drain terminal, and the fourth source/drain terminal is electrically coupled to the first gate terminal. The third transistor has a third gate terminal, a fifth source/drain terminal and a sixth source/drain terminal. The fifth source/drain terminal is electrically coupled to the fourth source/drain terminal and the first gate terminal, and the sixth source/drain terminal is electrically coupled to the second source/drain terminal. The first voltage divider is electrically coupled between the first source/drain terminal and the second source/drain terminal for supplying a first voltage to the second gate terminal according to a potential difference between the first source/drain terminal and the second source/drain terminal. The second voltage divider is electrically coupled between the first source/drain terminal and the second source/drain terminal for supplying a second voltage to the third gate terminal according to the potential difference between the first source/drain terminal and the second source/drain terminal.

In an exemplary embodiment of the present invention, the first transistor, the second transistor and the third transistor are n-type metal-oxide-semiconductor field-effect transistors or, alternatively, p-type metal-oxide-semiconductor field-effect transistors.

In an exemplary embodiment of the present invention, the first voltage divider comprises a first impedance and a second impedance. The first impedance is electrically coupled between the first source/drain terminal and the second gate terminal, and the second impedance electrically is coupled between the second gate terminal and the second source/drain terminal. Furthermore, a node where the first impedance and the second impedance are electrically couple to each other is used for supplying the first voltage.

In an exemplary embodiment of the present invention, the second voltage divider comprises a third impedance and a fourth impedance. The third impedance is electrically coupled between the first source/drain terminal and the third gate terminal, and the fourth impedance is electrically coupled between the third gate terminal and the second source/drain terminal. Furthermore, a node where the third impedance and the fourth impedance are electrically coupled to each other is used for supplying the second voltage.

In an exemplary embodiment of the present invention, the first impedance, the second impedance, the third impedance and the fourth impedance are implemented by a first capacitor, a second capacitor, a third capacitor and a fourth capacitor respectively. The capacitance value of the second capacitor is larger than that of the first capacitor, and the capacitance value of the third capacitor is larger than that of the fourth capacitor.

In an exemplary embodiment of the present invention, the first impedance, the second impedance, the third impedance and the fourth impedance are implemented by a first resistor, a second resistor, a third resistor and a fourth resistor respectively. The resistance value of the first resistor is larger than that of the second resistor, and the resistance value of the fourth resistor is larger than that of the third resistor.

In an exemplary embodiment of the present invention, the first impedance, the second impedance, the third impedance and the fourth impedance are implemented by a fourth transistor, a fifth transistor, a sixth transistor and a seventh transistor respectively. Two source/drain terminals of the fourth transistor are electrically coupled to the first source/drain terminal and the second gate terminal respectively. Two source/drain terminals of the fifth transistor are electrically coupled to the second gate terminal and the second source/drain terminal respectively. Two source/drain terminals of the sixth transistor are electrically coupled to the first source/drain terminal and the third gate terminal respectively. Two source/drain terminals of the seventh transistor are electrically coupled to the third gate terminal and the second source/drain terminal respectively. Each of the gate terminals of the fourth transistor, the fifth transistor, the sixth transistor and the seventh transistor is electrically coupled to a direct current voltage. The channel width of the fifth transistor is larger than that of the fourth transistor, and the channel width of the sixth transistor is larger than that of the seventh transistor.

In an exemplary embodiment of the present invention, the fourth transistor, the fifth transistor, the sixth transistor and the seventh transistor are n-type metal-oxide-semiconductor field-effect transistors, and the direct current voltage is a positive voltage.

In an exemplary embodiment of the present invention, the fourth transistor, the fifth transistor, the sixth transistor and the seventh transistor are p-type metal-oxide-semiconductor field-effect transistors, and the direct current voltage is a negative voltage.

In an exemplary embodiment of the present invention, the reference electrode is a common electrode disposed in the display panel or a shorting ring disposed in the display apparatus.

The ESD protection circuit of the present invention comprises three transistors and two voltage dividers. Compared with the ESD protection device shown in FIG. 1, the shift of the threshold voltage of the first transistor served as the main discharge route of the ESD protection circuit can be compensated due to the specific circuit character caused by the specific coupling relation of the components of the ESD protection circuit. Thus, the conducting capability of the first transistor is not easily to be affected. In addition, compared with the two ESD protection devices shown in FIGS. 2 and 3, the ESD protection circuit is not easily to be permanently damaged under the large electrostatic charge. Furthermore, compared with the ESD protection device shown in FIG. 4, the ESD protection circuit will not to increase the loading of the gate driver and the source driver. Therefore, the performance of the ESD protection circuit of the present invention is stable and reliable, and the ESD protection circuit can be used in place of the conventional ESD protection device. Furthermore, the ESD protection circuit will not to increase the loading of the gate driver and the source driver.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

First Exemplary Embodiment

Figure 5:
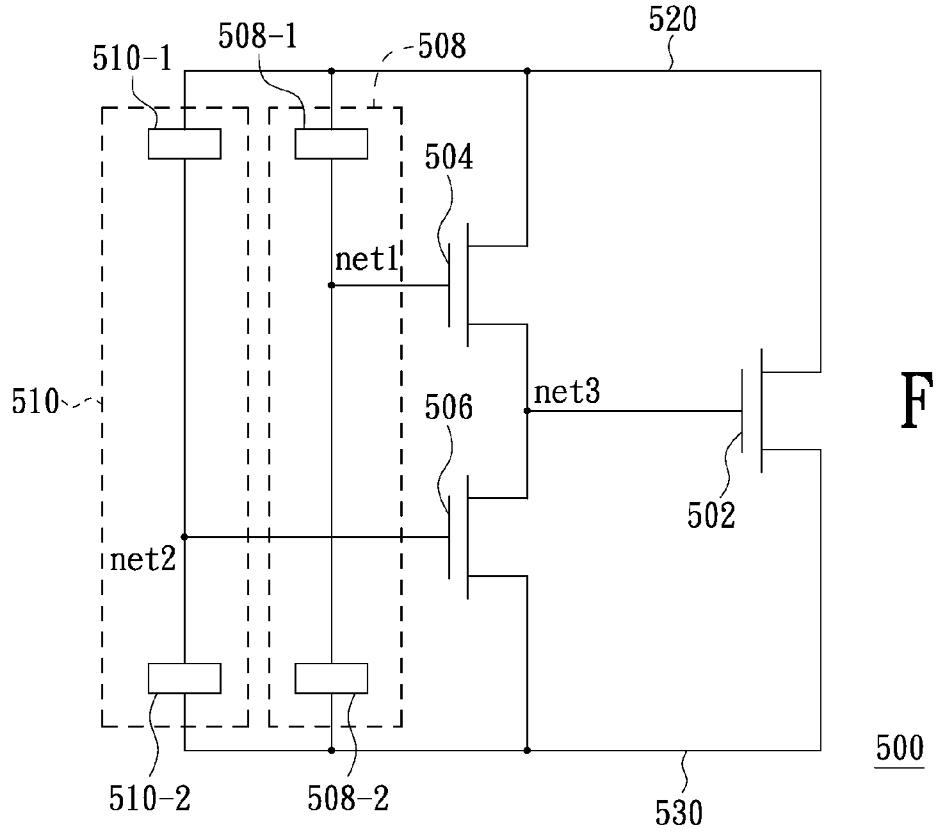
FIG. 5 is a schematic view of an ESD protection circuit in accordance with an exemplary embodiment of the present invention.

FIG. 5 is a schematic view of an ESD protection circuit in accordance with an exemplary embodiment of the present invention. Referring to FIG. 5, the ESD protection circuit 500 comprises a transistor 502, a transistor 504, a transistor 506, a voltage divider 508 and a voltage divider 510. In the exemplary embodiment, each of the transistors is an n-type metal-oxide-semiconductor (MOS) field-effect transistor. Preferably, the channel width of the transistor 504 is the same with that of the transistor 506, and the channel width of the transistor 502 is much greater than that of the transistor 504 (such as 10:1).

A source/drain terminal of the transistor 502 is electrically coupled to a power line 520, and the other source/drain terminal of the transistor 502 is electrically coupled to a power line 530. A source/drain terminal of the transistor 504 is electrically coupled to the power line 520, and the other source/drain terminal of the transistor 504 is electrically coupled to the gate terminal of the transistor 502. A source/drain terminal of the transistor 506 is electrically coupled to the gate terminal of the transistor 502, and the other source/drain terminal of the transistor 502 is electrically coupled to the power line 530. The voltage divider 508 is electrically coupled between the power line 520 and the power line 530 for supplying a first voltage to the gate terminal of the transistor 504 according to the potential difference between the power line 520 and the power line 530. The voltage divider 510 is electrically coupled between the power line 520 and the power line 530 for supplying a second voltage to the gate terminal of the transistor 506 according to the potential difference between the power line 520 and the power line 530.

The voltage divider 508 comprises an impedance 508-1 and an impedance 508-2. The impedance 508-1 is electrically coupled between the power line 520 and the gate terminal of the transistor 504, and the impedance 508-2 is electrically coupled to the gate terminal of the transistor 504 and the power line 530. A node (marked by net 1) where the impedance 508-1 and the impedance 508-2 are electrically coupled to each other is used for supplying the said first voltage. The voltage divider 510 comprises an impedance 510-1 and an impedance 510-2. The impedance 510-1 is electrically coupled between the power line 520 and the gate terminal of the transistor 506, and the impedance 510-2 is electrically coupled between the gate terminal of the transistor 506 and the power line 530. A node (marked by net 2) where the impedance 510-1 and the impedance 510-2 are electrically coupled to each other is used for supplying the said second voltage.

Figure 6:
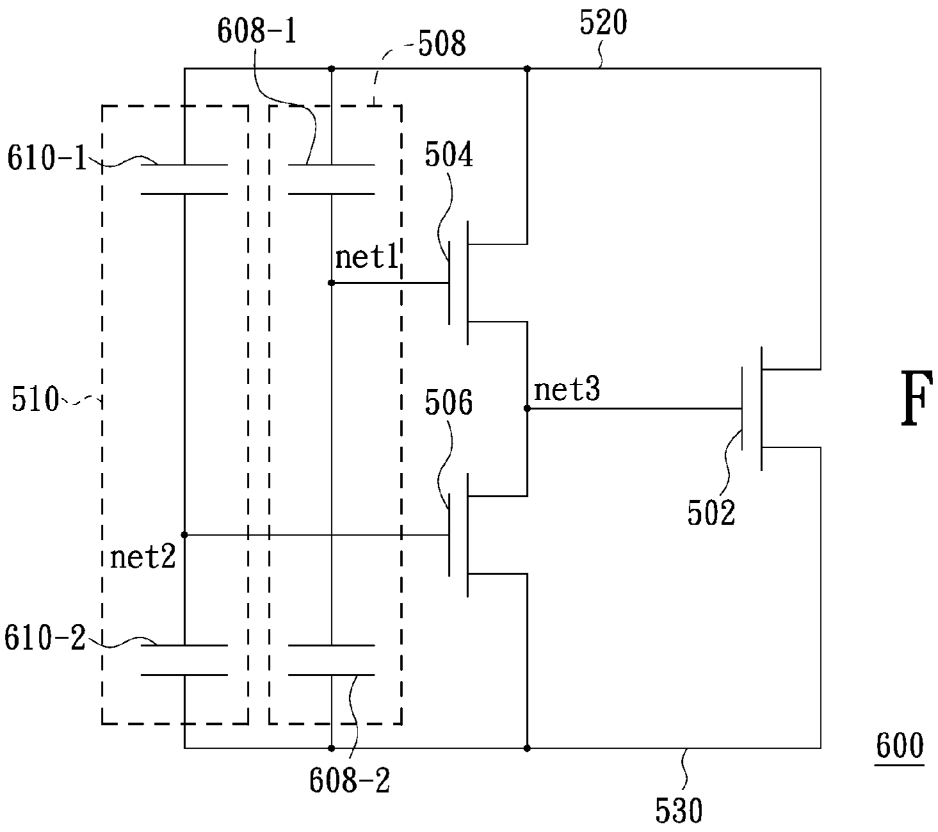
FIG. 6 is an exemplary embodiment of the ESD protection circuit as shown in FIG. 5.

As shown in FIG. 6, each of the above impedances can be implemented by a capacitor. FIG. 6 is a schematic view of an exemplary embodiment of the ESD protection circuit as shown in FIG. 5. In the exemplary embodiment shown by the ESD protection circuit 600, the impedances 508-1, 508-2, 510-1 and 510-2 can be implemented by the capacitors 608-1, 608-2, 610-1 and 610-2 respectively. The capacitance value of the capacitor 608-2 is larger than that of the capacitor 608-1, and the capacitance value of the capacitor 610-1 is larger than that of the capacitor 610-2. Preferably, the capacitance value of the capacitor 608-2 is same with that of the capacitor 610-1, and the capacitance value of the capacitor 608-1 is same with that of the capacitor 610-2. Thus, as long as one of the power lines is electrically coupled to the reference potential, the other power line can be electrically coupled to any conductor such as a pin of an integrated circuit (IC) or a conducting wire. Thus, the ESD protection circuit 600 can rapidly release the energy of the electrostatic discharge when an ESD event occurs on the said conductor.

Referring to FIG. 6, to illustrate, we may firstly assume that the power line 520 is electrically coupled a conducting wire (not shown), and the conducting wire is used for transmitting a pulse signal which has a voltage of −9V~27V. And we may assume that the power line 530 is electrically coupled to the reference potential which is +6V. In addition, we may assume that the ratio of the capacitance value of the capacitor 608-1 to the capacitance value of the capacitor 608-2 is 1:49, and the ratio of the capacitance value of the capacitor 610-1 to the capacitance value of the capacitor 610-2 is 49:1. Furthermore, we may also assume that the capacitance value of the capacitor 608-2 is the same with that of the capacitor 610-1, and the capacitance value of the capacitor 608-1 is the same with that of the capacitor 610-2.

Based on the above assumption, when there is no ESD event occurs on the conducting wire and the voltage of the conducting wire is at a high potential, the transistor 506 is highly turned on as compared with the transistor 504 because the voltage across the capacitor 610-2 is larger than the voltage across the capacitor 608-2, so that the voltage of the node net 3 is pulled down to a voltage level nearest to the reference potential. Since the voltage of the node net 3 is pulled down to the voltage level nearest to the reference potential, the Vgs (i.e., the voltage across the gate terminal and the source terminal) of the transistor 502 is not high enough so that the transistor 502 can not be turned on. In other words, the transistor 502 served as the main discharge route is not turned on in this condition, and only a small amount of leakage current passes through the transistor 502.

On the contrary, when there is no ESD event occurs on the conducting wire and the voltage of the conducting wire is at a low potential, the operation of the whole circuit can be analyzed by a contrary analysis because the locations of the drain terminals and the source terminals of the three transistors at this moment are opposite to the locations of the drain terminals and the source terminals of the three transistors at the time when the voltage of the conducting wire is at the high potential. That is, at this moment the voltage across the capacitor 608-1 is larger than the voltage across the capacitor 610-1, so that the transistor 504 is highly turned on as compared with the transistor 506. Thus, the voltage of the node net 3 is pulled to the voltage level nearest to the potential of the conducting wire. Since the voltage of the node net 3 is pulled to the voltage level nearest to the potential of the conducting wire, the Vgs of the transistor 502 is still not high enough so that the transistor 502 can not turned on. In other words, the transistor 502 served as the main discharge route is still not turned on in this condition, and only a small amount of leakage current passes through the transistor 502. From the above description, it can be seen that the ESD protection circuit 600 does not to increase the power-consumption additionally when there is no ESD event occurs on the conducting wire.

However, when a positive ESD event occurs on the conducting wire, the instant potential difference between the power line 520 and the power line 530 will probably be several thousands of volts. This makes the transistor 504 and the transistor 506 to be highly turned on and to be in saturation state (or breakdown). Therefore, although the effect of designing the voltage of the node net 3 being pulled down to the low potential is remained, the effect mentioned above is still correspondingly reduced under the said several thousands of volts. Therefore, under the voltage dividing principle, the potential difference between the node net 3 and the power line 530 is larger than the Vgs of the transistor 502 to turn on the transistor 502. In other words, at this moment the transistor 502 served as the main discharge route is turned on, so as to rapidly release the electrostatic energy.

On the contrary, when a negative ESD event occurs on the conducting wire, the operation of the whole circuit can be analyzed by a contrary analysis because the locations of the drain terminals and the source terminals of the three transistors at this moment are opposite to the locations of the drain terminals and the source terminals of the three transistors at the time when the positive ESD event occurs on the conducting wire. Therefore, under the voltage dividing principle, the potential difference between the node net 3 and the power line 520 is still larger than the Vgs of the transistor 502 to turn on the transistor 502. In other words, at this moment the transistor 502 served as the main discharge route is turned on to rapidly release the electrostatic energy.

It should be noted that, even if after the ESD event, the threshold voltage of the transistor 502 is shifted along the positive direction, so that the node net 3 must have a higher potential to turn on the transistor 502. However, since the threshold voltage of the transistor 506 is also shifted along the positive direction, this will weaken the capability that the transistor 506 pulls down the potential of the node net 3 to make the potential of the node net 3 to be higher than the original potential thereof. Therefore, it just compensates the shifting amount of the threshold voltage of the transistor 502 served as the main discharge route.

Figure 7:
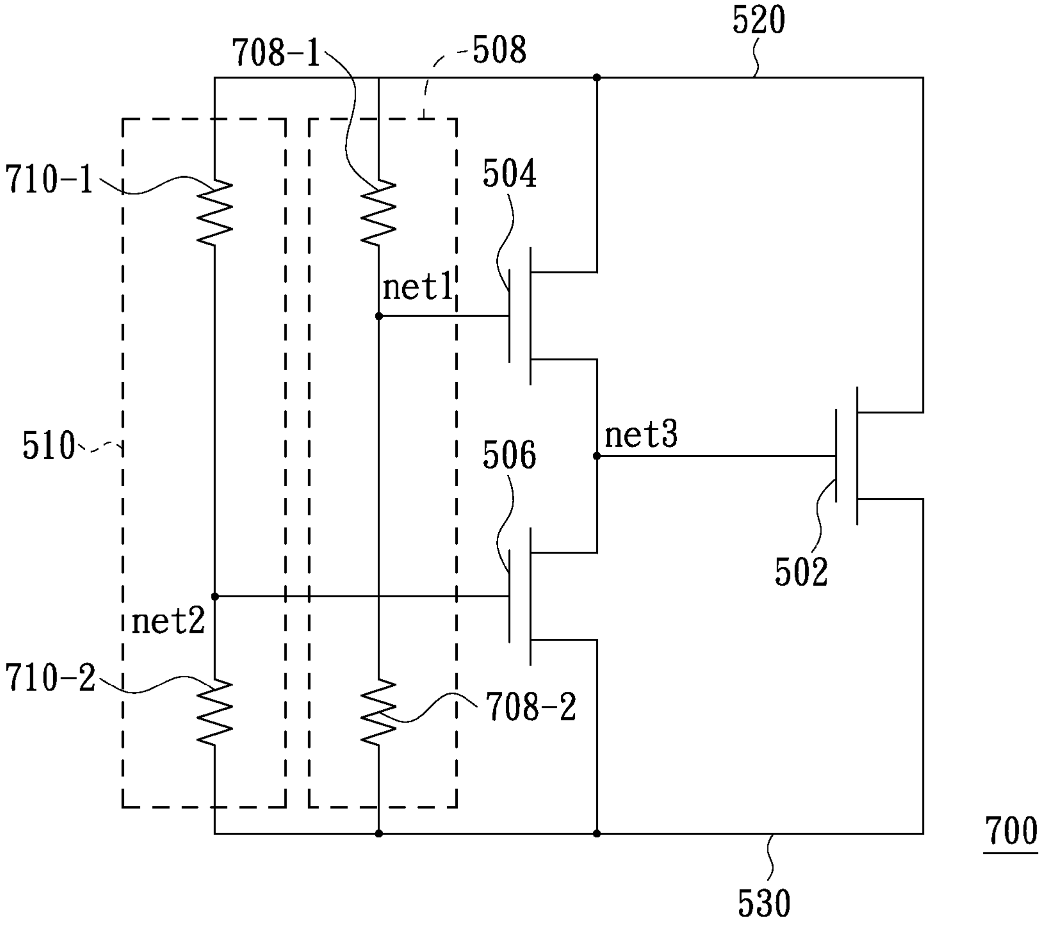
FIG. 7 is another exemplary embodiment of the ESD protection circuit as shown in FIG. 5.

From the above description, it is understood for persons skilled in the art that each of the impedances of the ESD protection circuit 500 can be implemented by a resistor as shown in FIG. 7. FIG. 7 is another exemplary embodiment of the ESD protection circuit as shown in FIG. 5. In the exemplary embodiment shown by the ESD protection circuit 700, the impedances 508-1, 508-2, 510-1 and 510-2 are implemented by resistors 708-1, 708-2, 710-1 and 710-2 respectively. The resistance value of the resistor 708-1 is larger than that of the resistor 708-2, and the resistance value of the resistor 710-2 is larger than that of the resistor 710-1. Preferably, the resistance value of the resistor 708-1 is the same with that of the resistor 710-2, and the resistance value of the resistor 708-2 is the same with that of the resistor 710-1. For example, the ratio of the resistance value of the resistor 708-1 to the resistance value of the resistor 708-2 can be 49:1, and the ratio of the resistance value of the resistor 710-1 to the resistance value of the resistor 710-2 can also be 1:49. Furthermore, the resistance value of the resistor 708-1 is the same with that of the resistor 710-2, and the resistance value of the resistor 708-2 is the same with that of the resistor 710-1. In addition, if we expect that there is no current passes through the voltage dividers when the pulse signal is normally transmitted, the resistance value of the resistor must be large since the resistor consumes electronic power under the direct current instead of being cut off as the capacitor under the direct current. It should be noted that the voltage-dividing mode of the resistors in series is opposite to that of the capacitors in series.

Figure 8:
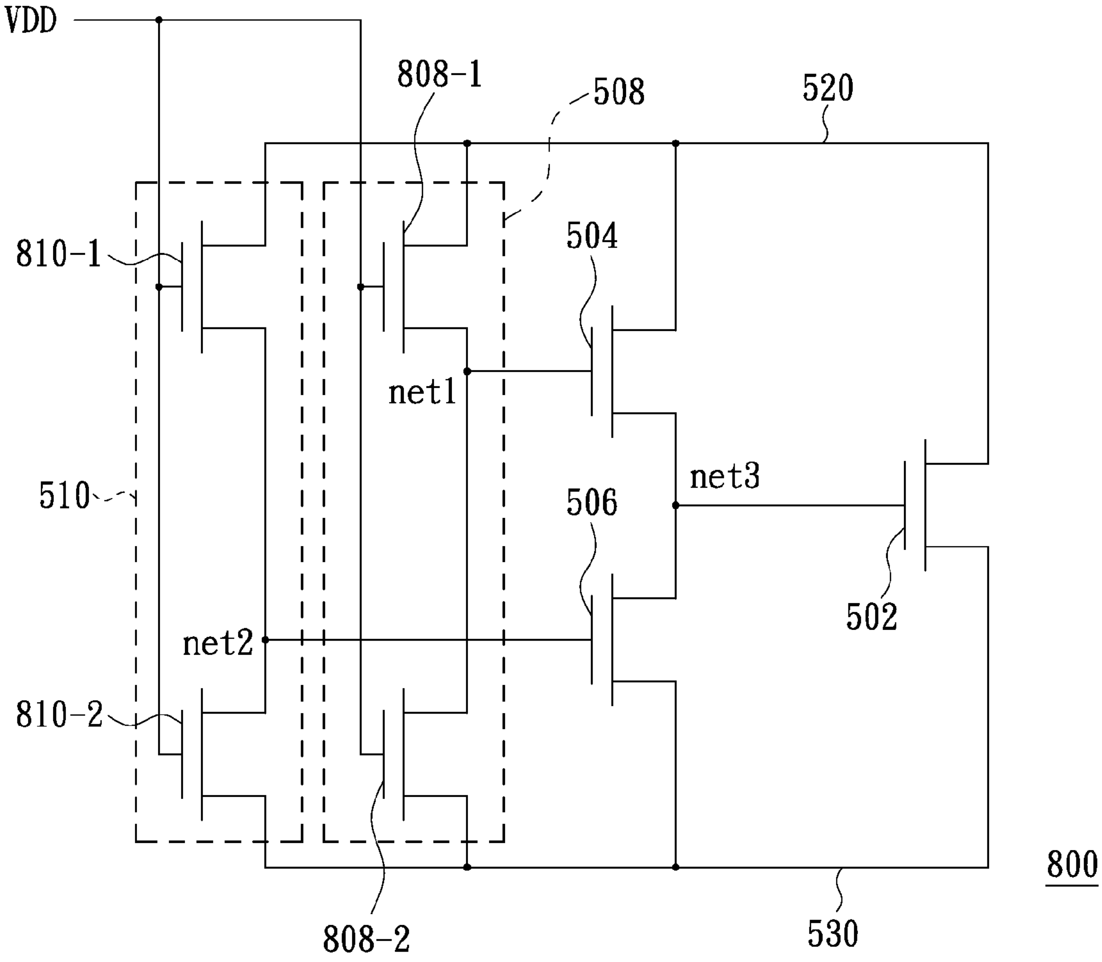
FIG. 8 is other exemplary embodiment of the ESD protection circuit as shown in FIG. 5.

In addition, it is understood for persons skilled in the art that each of the impedances of the ESD protection circuit 500 may be implemented by a transistor as shown in FIG. 8. FIG. 8 is other exemplary embodiment of the ESD protection circuit as shown in FIG. 5. In the exemplary embodiment shown by the ESD protection circuit 800, the impedances 508-1, 508-2, 510-1 and 510-2 are implemented by the transistors 808-1, 808-2, 810-1 and 810-2 respectively, and each of the transistors 808-1, 808-2, 810-1 and 810-2 is a n-type metal-oxide-semiconductor (MOS) field-effect transistor (FET). Two source/drain terminals of the transistor 808-1 are electrically coupled to the power line 520 and the gate terminal of the transistor 504 respectively. Two source/drain terminals of the transistor 808-2 are electrically coupled to the gate terminal of the transistor 504 and the power line 530 respectively. Two source/drain terminals of the transistor 810-1 are electrically coupled to the power line 520 and the gate of the transistor 506 respectively. Two source/drain terminals of the transistor 810-2 are electrically coupled to the gate terminal of the transistor 506 and the power line 530 respectively. In addition, each of the gate terminals of the transistors 808-1, 808-2, 810-1 and 810-2 is electrically coupled to a direct-current voltage VDD, and the direct-current voltage VDD is a positive voltage. Thus, the four transistors can be used as four resistors.

In addition, the channel width of the transistor 808-2 is larger than that of the transistor 808-1, and the channel width of the transistor 810-1 is larger than that of the transistor 810-2. Preferably, the channel width of the transistor 808-1 is the same with that of the transistor 810-2, and the channel width of the transistor 808-2 is the same with that of the transistor 810-1. For example, the ratio of the channel width of the transistor 808-1 to the channel width of the transistor 808-2 can be 100:5000, and the ratio of the channel width of the transistor 810-1 to the channel width of the transistor 810-2 can be 5000:100. Furthermore, the channel width of the transistor 808-1 is the same with that of the transistor 810-2, and the channel width of the transistor 808-2 is the same with that of the transistor 810-1.

Certainly, each of the impedances can also be implemented by a p-type MOS FET as long as the direct-current voltage VDD is a negative voltage. Furthermore, the channel widths of the p-type MOS FETs should be the same with those of the replaced n-type MOS FETs.

Second Exemplary Embodiment

Figure 9:
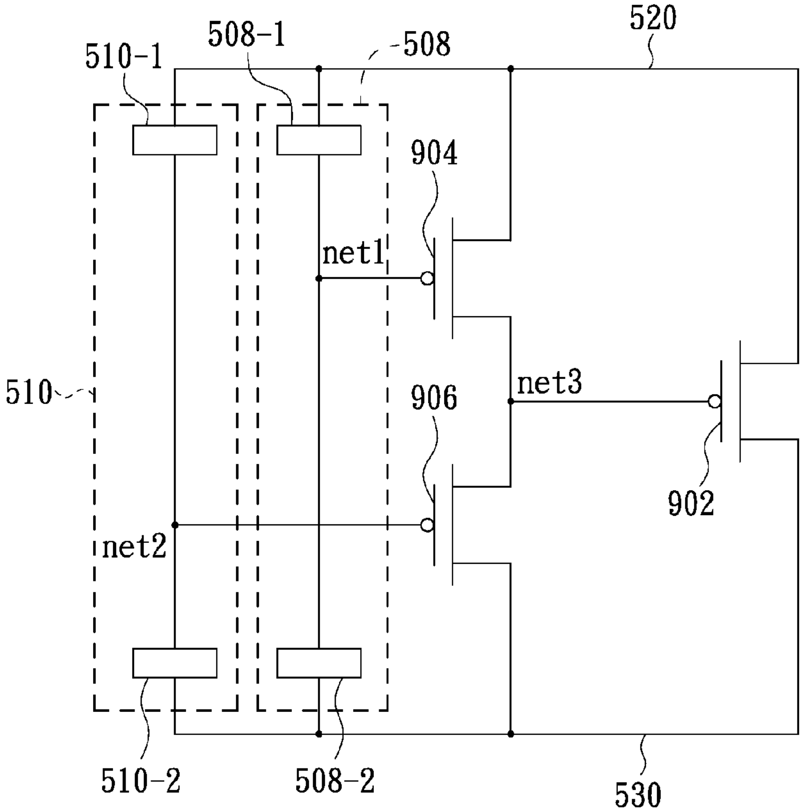
FIG. 9 is a schematic view of an ESD protection circuit in accordance with another exemplary embodiment of the present invention.

FIG. 9 is a schematic view of an ESD protection circuit in accordance with another exemplary embodiment of the present invention. In FIGS. 9 and 5, the objects of uniform labels represent the same element. Referring to FIG. 9, the ESD protection circuit 900 is similar to the ESD protection circuit 500 shown in FIG. 5 except that each of the transistor 902, the transistor 904 and the transistor 906 of the ESD protection circuit 900 is a p-type MOS FET. Preferably, the channel width of the transistor 904 is the same with that of the transistor 906, and the channel width of the transistor 902 is much greater than that of the transistor 904 (such as 10:1).

Figure 10:
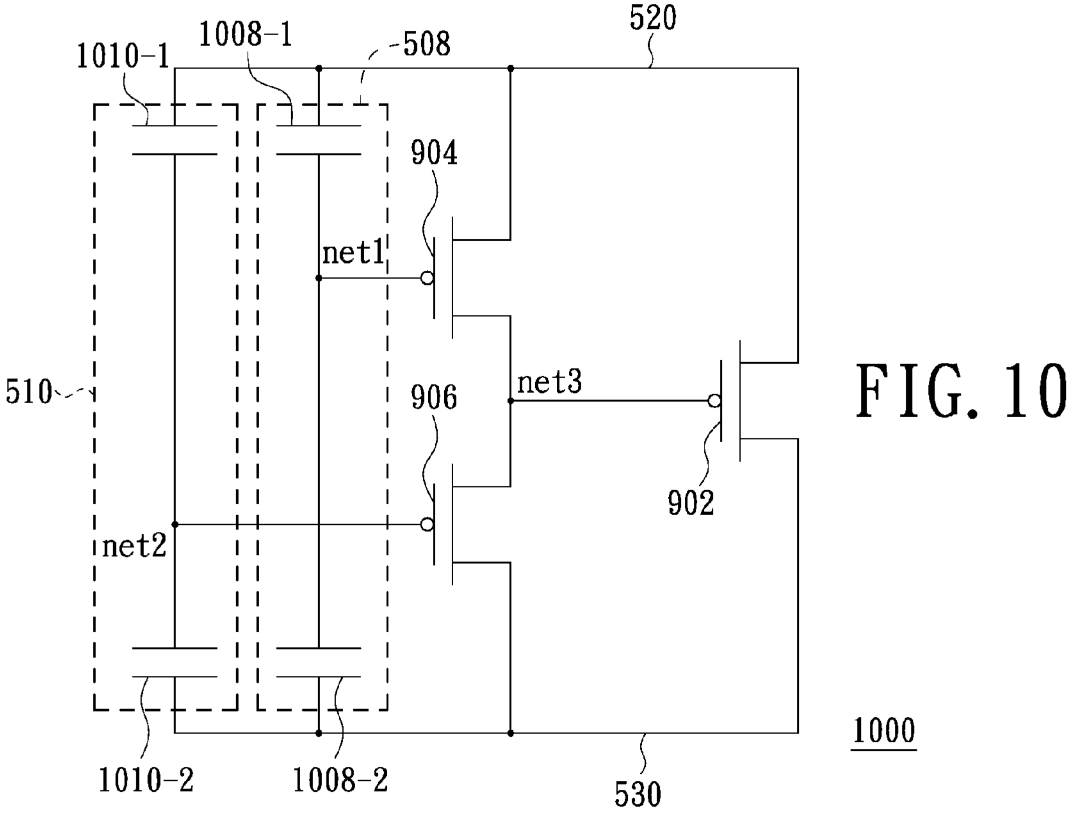
FIG. 10 is an exemplary embodiment of the ESD protection circuit as shown in FIG. 9.

Each of the impedances of the ESD protection circuit 900 can also be implemented by a capacitor as shown in FIG. 10. FIG. 10 is an exemplary embodiment of the ESD protection circuit as shown in FIG. 9. In the exemplary embodiment of the ESD protection circuit 1000, the impedances 508-1, 508-2, 510-1 and 510-2 are implemented by the capacitors 1008-1, 1008-2, 1010-1 and 1010-2 respectively. In this exemplary embodiment, the capacitance value of the capacitor 1008-2 is larger than that of the capacitor 1008-1, and the capacitance value of the capacitor 1010-1 is larger than that of the capacitor 1010-2. Preferably, the capacitance value of the capacitor 1008-2 is the same with that of the capacitor 1010-1, and the capacitance value of the capacitor 1008-1 is the same with that of the capacitor 1010-2. Therefore, as long as one of the power lines is electrically coupled to the reference potential, the other power line can be electrically coupled to any conductor. Thus, the ESD protection circuit 1000 can also rapidly release the electrostatic charge energy when an ESD event occurs on the conductor.

Refer to FIG. 10, to illustrate, we may firstly assume that the power line 520 is electrically coupled to a conducting wire (not shown), and the conducting wire is used for transmitting a pulse signal which has a voltage of −9V~27V. And we may assume that the power line 530 is electrically coupled to the reference potential, and the reference potential has a voltage of +6V. In addition, we may assume that the ratio of the capacitance value of the capacitor 1008-1 to the capacitance value of the capacitor 1008-2 is 1:49, and the ratio of the capacitance value of the capacitor 1010-1 to the capacitance value of the capacitor 1010-2 is 49:1. Furthermore, we also assume that the capacitance value of the capacitor 1008-2 is the same with that of the capacitor 1010-1, and the capacitance value of the capacitor 1008-1 is the same with that of the capacitor 1010-2.

Based on the above assumption, when there is no ESD event occurs on the conducting wire and the voltage of the conducting wire is at a high potential, the transistor 904 is highly turned on as compared with the transistor 906 since the voltage across the capacitor 1008-1 is larger than the voltage across the capacitor 1010-1, so that the voltage of the node net 3 is pulled to a voltage level nearest to the voltage of the conducting wire. Since the voltage of the node net 3 is pulled to the voltage level nearest to the voltage of the conducting wire, the Vsg (i.e., the voltage across the source terminal and the gate terminal) of the transistor 902 is not high enough to turn on the transistor 902. In other words, the transistor 902 served as the main discharge route is not turned on under this condition, and only a small amount of leakage current passes through the transistor 902.

On the contrary, when there is no ESD event occurs on the conducting wire and the voltage of the conducting wire is at a low potential, the operation of the whole circuit can be analyzed by a contrary analysis because the locations of the drain terminals and the source terminals of the three transistors at this moment are opposite to the locations of the drain terminals and the source terminals of the three transistors at the time when the voltage of the conducting wire is at the high potential. That is, at this moment the voltage across the capacitor 1010-2 is larger than the voltage across the capacitor 1008-2, so that the transistor 906 is highly turned on as compared with the transistor 904. Thus, the voltage of the node net 3 is pulled to a voltage level nearest to the reference potential. Since the voltage of the node net 3 is pulled to the voltage level nearest to the reference potential, the Vsg of the transistor 902 is still not high enough so that the transistor 902 is still not turned on. In other words, the transistor 902 served as the main discharge route is still not turned on under this condition, and only a small amount of leakage current passes through the transistor 902. From the above description, it can be seen that the ESD protection circuit 1000 does not to increase the power consumption additionally when there is no ESD event occurs on the conducting wire.

However, when a positive ESD event occurs on the conducting wire, the instant potential difference between the power line 520 and the power line 530 will probably be several thousands of volts. This makes the transistor 904 and the transistor 906 to be highly turned on and to be in saturation state (or breakdown). Therefore, although the effect of designing the voltage of the node net 3 being pulled down to the low potential is remained, the effect mentioned above is still relatively decreased under the said several thousands of the volts. Therefore, under the voltage dividing principle, the potential difference between the power line 520 and the node net 3 is larger than the Vsg of the transistor 902 to turn on the transistor 902. In other words, at this moment the transistor 902 served as the main discharge route is turned on, so as to rapidly release the electrostatic charge energy.

On the contrary, when a negative ESD event occurs on the conducting wire, the operation of the whole circuit can be analyzed by a contrary analysis because the locations of the drain terminals and the source terminals of the three transistors at this moment are opposite to the locations of the drain terminals and the source terminals of the three transistors at the time when the positive ESD event occurs on the conducting wire. Therefore, under the voltage dividing principle, the potential difference between the power line 530 and the node net 3 is still larger than the Vsg of the transistor 902 to turn on the transistor 902. In other words, at this moment the transistor 902 served as the main discharge route is turned on to rapidly release the electrostatic charge energy.

From the above description, it is understood for persons skilled in the art that each of the impedances of the ESD protection circuit 900 can also be implemented by a resistor or a transistor as shown in FIGS. 7 and 8. The design related to the resistance values of the resistors is the same with the design described in the description of FIG. 7, and the design related to the channel-widths of the transistors is the same with the design described the description of FIG. 8.

Third Exemplary Embodiment

Figure 11:
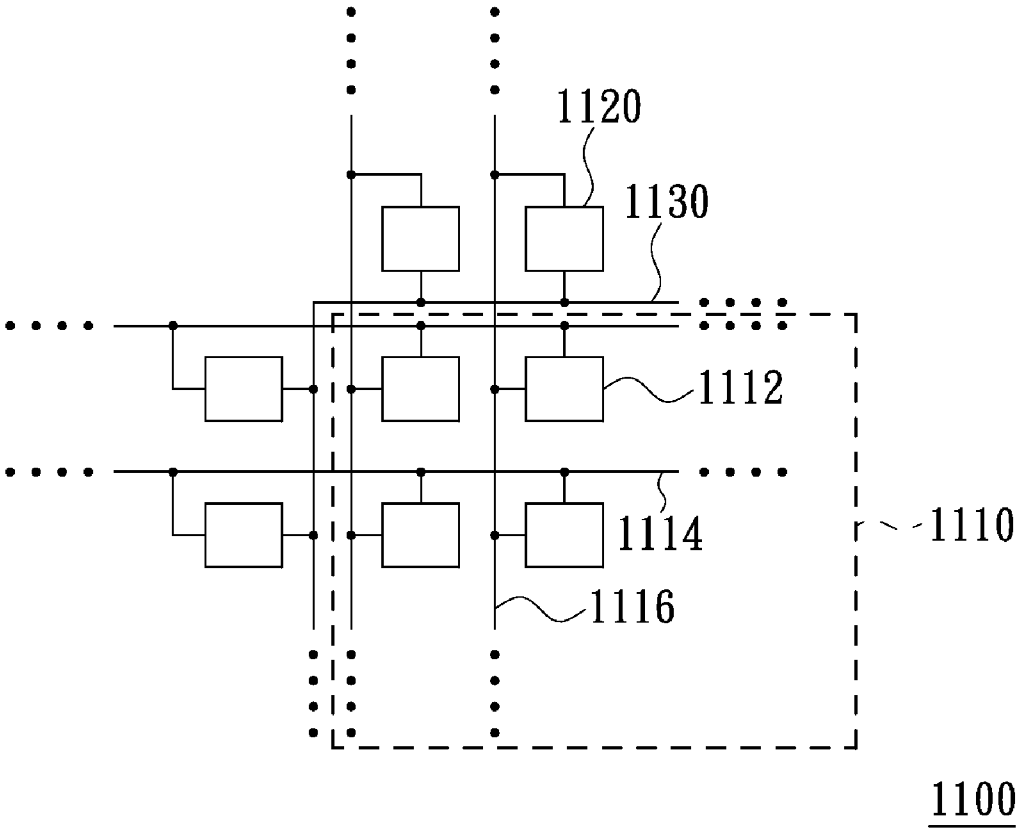
FIG. 11 is a schematic view of a display apparatus in accordance with an exemplary embodiment of the present invention.

The exemplary embodiment is mainly configured for describing how to apply the ESD protection circuit of the present invention into a display apparatus (such as a liquid crystal display apparatus). Refer to FIG. 11, which is a schematic view of a display apparatus in accordance with an exemplary embodiment of the present invention. The display apparatus 1100 comprises a display panel 1110, a plurality of ESD protection circuits 1120 and a shorting ring 1130. The display panel 1110 comprises a plurality of pixels 1112, a plurality of gate lines 1114 and a plurality of source lines 1116. Each of the pixels 1112 is electrically coupled to a corresponding gate line 1114 and a corresponding source line 1116.

Each of the ESD protection circuits 1120 is electrically coupled to the shorting ring 1130, and each of the ESD protection circuits 1120 is electrically coupled to one of the gate lines 1114 and the source lines 1116. In brief, the gate lines 1114 and the source lines 1116 are served as the power line 520 described in the above exemplary embodiments, and the shorting ring 1130 is served as the power line 530 described in the above exemplary embodiments. Certainly, each of the ESD protection circuits 1120 can be electrically coupled to a common electrode (not shown) disposed in the display panel 1110 instead of the shorting ring 1130. Thus, the display apparatus 1100 does not need to adopt the shorting ring 1130. Furthermore, each of the ESD protection circuits 1120 can be electrically coupled to other reference electrode (not shown) instead of the shorting ring 1130 as long as the reference electrode is configured for providing a reference potential. In addition, each of the ESD protection circuits 1120 can be implemented by the circuit structure as shown in FIG. 5*or* the circuit structure as shown in FIG. 9, and it is not limited herein.

Figure 1:
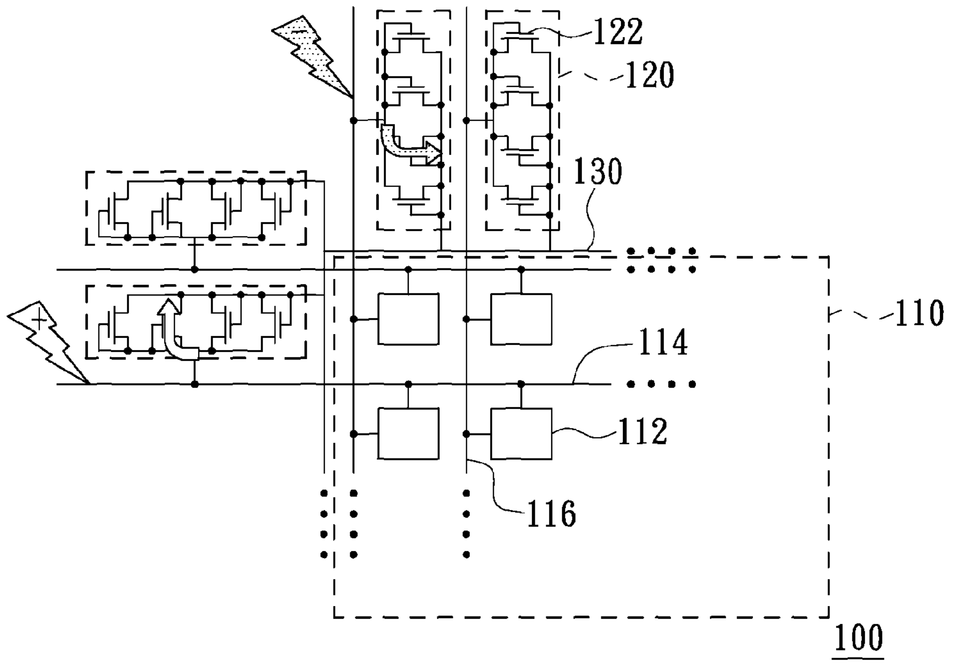
FIG. 1(Prior Art)
FIG. 1 is a schematic view of a conventional LCD apparatus.
Figure 2:
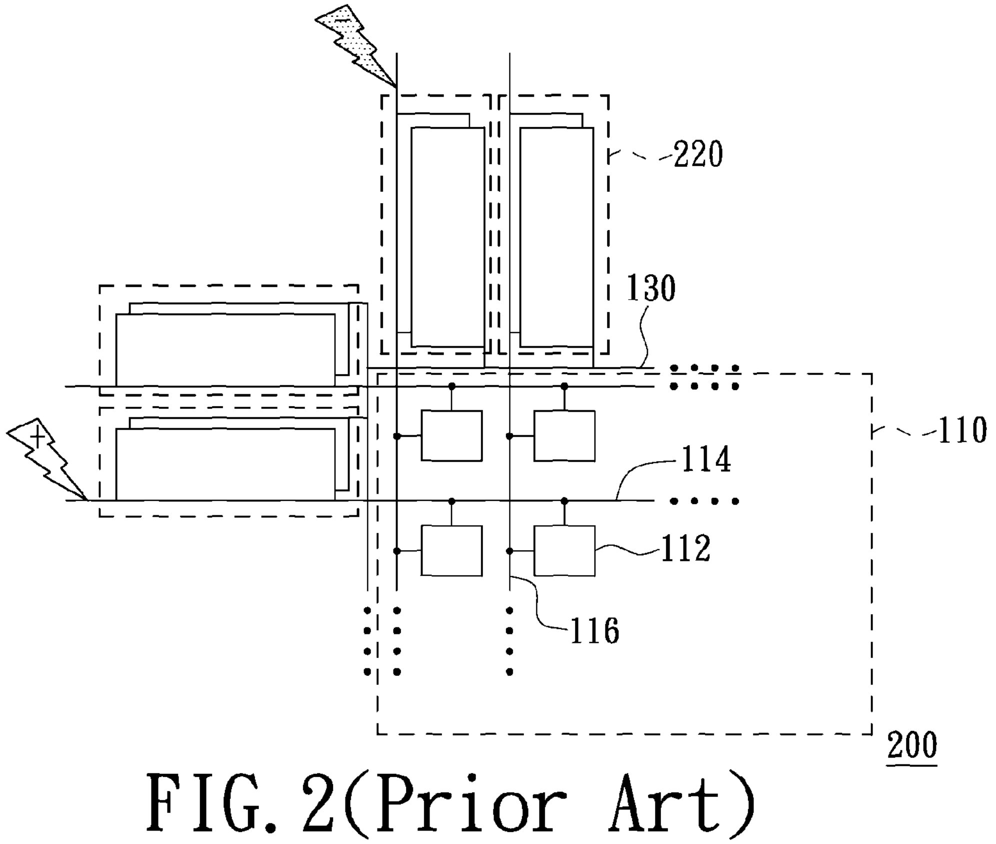
FIG. 2(Prior Art)
FIG. 2 is a schematic view of another conventional LCD apparatus.
Figure 3:
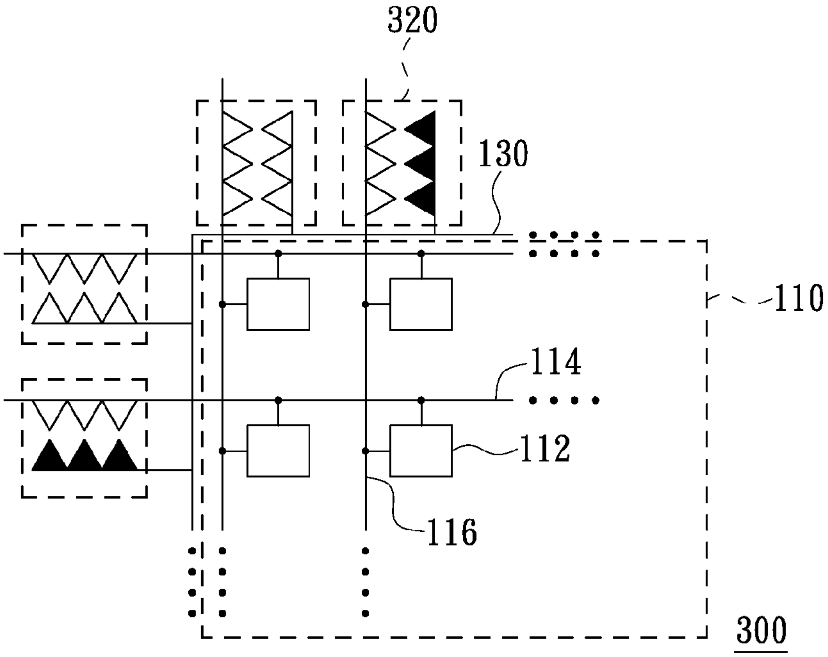
FIG. 3(Prior Art)
FIG. 3 is also a schematic view of another conventional LCD apparatus.
Figure 4:
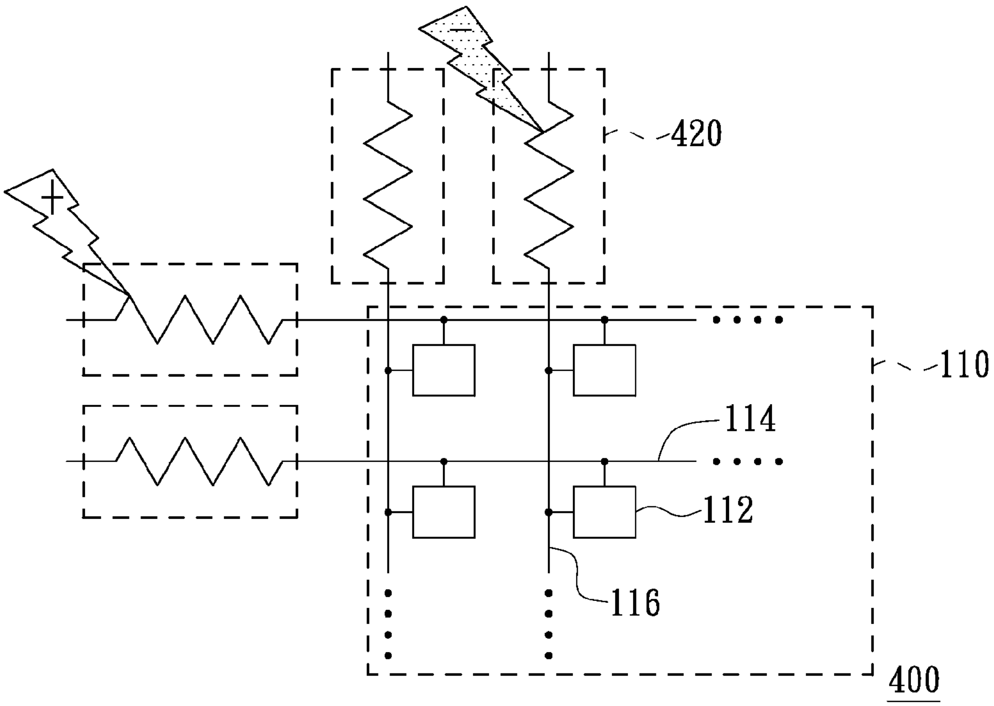
FIG. 4(Prior Art)
FIG. 4 is a schematic view of still another conventional LCD apparatus.

In summary, the ESD protection circuit of the present invention comprises three transistors and two voltage dividers. Compared with the ESD protection device shown in FIG. 1, the shift of the threshold voltage of the first transistor served as the main discharge route of the ESD protection circuit can be compensated due to the specific circuit character caused by the specific coupling relation of the components of the ESD protection circuit. Thus, the conducting capability of the first transistor is not easily to be affected. In addition, compared with the two ESD protection devices shown in FIGS. 2 and 3, the ESD protection circuit is not easily to be permanently damaged under the large electrostatic charge. Furthermore, compared with the ESD protection device shown in FIG. 4, the ESD protection circuit will not to increase the loading of the gate driver and the source driver. Therefore, the performance of the ESD protection circuit of the present invention is stable and reliable, and the ESD protection circuit can be used in place of the conventional ESD protection device. Furthermore, the ESD protection circuit will not to increase the loading of the gate driver and the source driver. In addition, the ESD protection circuit of the present invention only needs a discharge route (i.e., the third transistor) to release the energy of the electrostatic charge with different polarity. And the size of the ESD protection circuit is small because the ESD protection circuit does not need more than one discharge route, so that the ESD protection circuit just occupies a small space.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An ESD protection circuit, comprising:

a first transistor having a first gate terminal, a first source/drain terminal and a second source/drain terminal, the first source/drain terminal being electrically coupled to a first power line, and the second source/drain terminal being electrically coupled to a second power line;

a second transistor having a second gate terminal, a third source/drain terminal and a fourth source/drain terminal, the third source/drain terminal being electrically coupled to the first power line, and the fourth source/drain terminal being electrically coupled to the first gate terminal;

a third transistor having a third gate terminal, a fifth source/drain terminal and a sixth source/drain terminal, the fifth source/drain terminal being electrically coupled to the fourth source/drain terminal and the first gate terminal, and the sixth source/drain terminal being electrically coupled to the second power line;

a first voltage divider comprising a first impedance and a second impedance electrically coupled in series between the first power line and the second power line for supplying a first voltage to the second gate terminal according to a potential difference between the first power line and the second power line; and a second voltage divider comprising a third impedance and a fourth impedance electrically coupled in series between the first power line and the second power line for supplying a second voltage to the third gate terminal according to the potential difference between the first power line and the second power line;

wherein one of a ratio of an impedance value of the first impedance to that of the second impedance and a ratio of an impedance value of the third impedance to that of the fourth impedance is more than 1, and the other of the ratio of the impedance value of the first impedance to that of the second impedance and the ratio of the impedance value of the third impedance to that of the fourth impedance is less than 1.

2. The ESD protection circuit as claimed in claim 1, wherein the first transistor, the second transistor and the third transistor are n-type metal-oxide-semiconductor field-effect transistors.

3. The ESD protection circuit as claimed in claim 2, wherein a channel width of the second transistor is the same with that of the third transistor, and a channel width of the first transistor is larger than that of the second transistor.

4. The ESD protection circuit as claimed in claim 1, wherein the first voltage divider comprises:

the first impedance electrically coupled between the first power line and the second gate terminal; and the second impedance electrically coupled between the second gate terminal and the second power line, wherein a node where the first impedance and the second impedance are electrically coupled to each other is used for supplying the first voltage.

5. The ESD protection circuit as claimed in claim 4, wherein the second voltage divider comprises:

the third impedance electrically coupled between the first power line and the third gate terminal; and the fourth impedance electrically coupled between the third gate terminal and the second power line, wherein a node where the third impedance and the fourth impedance are electrically coupled to each other is used for supplying the second voltage.

6. The ESD protection circuit as claimed in claim 5, wherein the first impedance, the second impedance, the third impedance and the fourth impedance are implemented by a first capacitor, a second capacitor, a third capacitor and a fourth capacitor respectively, a capacitance value of the second capacitor is larger than that of the first capacitor, and a capacitance value of the third capacitor is larger than that of the fourth capacitor.

7. The ESD protection circuit as claimed in claim 5, wherein the first impedance, the second impedance, the third impedance and the fourth impedance are implemented by a first resistor, a second resistor, a third resistor and a fourth resistor respectively, a resistance value of the first resistor is larger than that of the second resistor, and a resistance value of the fourth resistor is larger than that of the third resistor.

8. The ESD protection circuit as claimed in claim 5, wherein the first impedance, the second impedance, the third impedance and the fourth impedance are implemented by a fourth transistor, a fifth transistor, a sixth transistor and a seventh transistor respectively, the two source/drain terminals of the fourth transistor are electrically coupled to the first power line and the second gate terminal respectively, the two source/drain terminals of the fifth transistor are electrically coupled to the second gate terminal and the second power line respectively, the two source/drain terminals of the sixth transistor are electrically coupled to the first power line and the third gate terminal respectively, the two source/drain terminals of the seventh transistor are electrically coupled to the third gate terminal and the second power line respectively, each of the gate terminals of the fourth transistor, the fifth transistor, the sixth transistor and the seventh transistor is electrically coupled to a direct current voltage, a channel width of the fifth transistor is larger than that of the fourth transistor, and a channel width of the sixth transistor is larger than that of the seventh transistor.

9. The ESD protection circuit as claimed in claim 8, wherein the fourth transistor, the fifth transistor, the sixth transistor and the seventh transistor are n-type metal-oxide-semiconductor field-effect transistors, and the direct current voltage is a positive voltage.

10. The ESD protection circuit as claimed in claim 8, wherein the fourth transistor, the fifth transistor, the sixth transistor and the seventh transistor are p-type metal-oxide-semiconductor field-effect transistors, and the direct current voltage is a negative voltage.

11. The ESD protection circuit as claimed in claim 1, wherein the first transistor, the second transistor and the third transistor are p-type metal-oxide-semiconductor field-effect transistors.

12. A display apparatus with an ESD protection circuit, comprising:

a display panel having a pixel, a gate line and a source line, the pixel being electrically coupled to the gate line and the source line; and an ESD protection circuit, comprising:

a first transistor having a first gate terminal, a first source/drain terminal and a second source/drain terminal, the first source/drain terminal being electrically coupled to the gate line or the source line, and the second source/drain terminal being electrically coupled to a reference electrode;

a second transistor having a second gate terminal, a third source/drain terminal and a fourth source/drain terminal, the third source/drain terminal being electrically coupled to the first source/drain terminal, and the fourth source/drain terminal being electrically coupled to the first gate terminal;

a third transistor having a third gate terminal, a fifth source/drain terminal and a sixth source/drain terminal, the fifth source/drain terminal being electrically coupled to the fourth source/drain terminal and the first gate terminal, and the sixth source/drain terminal being electrically coupled to the second source/drain terminal;

a first voltage divider comprising a first impedance and a second impedance electrically coupled in series between the first source/drain terminal and the second source/drain terminal for supplying a first voltage to the second gate terminal according to a potential difference between the first source/drain terminal and the second source/drain terminal; and a second voltage divider comprising a third impedance and a fourth impedance electrically coupled in series between the first source/drain terminal and the second source/drain terminal for supplying a second voltage to the third gate terminal according to the potential difference between the first source/drain terminal and the second source/drain terminal;

wherein one of a ratio of an impedance value of the first impedance to that of the second impedance and a ratio of an impedance value of the third impedance to that of the fourth impedance is more than 1, and the other of the ratio of the impedance value of the first impedance to that of the second impedance and the ratio of the impedance value of the third impedance to that of the fourth impedance is less than 1.

13. The display apparatus as claimed in claim 12, wherein the reference electrode is a common electrode disposed in the display panel or a shorting ring disposed in the display apparatus.

* * * * *